US010006993B1

(12) United States Patent
Yujiri

(10) Patent No.: US 10,006,993 B1
(45) Date of Patent: Jun. 26, 2018

(54) COMPACT PASSIVE MILLIMETER WAVE (PMMW) CAMERA

(71) Applicant: Northrop Grumman Systems Corporation, Falls Church, VA (US)

(72) Inventor: Mikio L. Yujiri, Manhattan Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 124 days.

(21) Appl. No.: 15/335,494

(22) Filed: Oct. 27, 2016

(51) Int. Cl.
*G01S 13/89* (2006.01)
*G02B 5/30* (2006.01)

(52) U.S. Cl.
CPC ............ *G01S 13/89* (2013.01); *G02B 5/3058* (2013.01)

(58) Field of Classification Search
CPC ....... G01S 13/89; G02B 5/3058; H01L 27/14; G01J 1/56
See application file for complete search history.

(56) References Cited

U.S. PATENT DOCUMENTS

| 4,901,084 A * | 2/1990 | Huguenin ............... G01S 7/024 250/332 |
| 4,910,523 A * | 3/1990 | Huguenin ............... G01S 7/024 250/332 |
| 6,014,108 A | 1/2000 | Lynch et al. |
| 6,307,522 B1 | 10/2001 | Alexanian |
| 6,965,784 B2 | 11/2005 | Kanamaluru et al. |
| 7,522,274 B2 * | 4/2009 | Salmon ................ G01K 11/006 356/216 |
| 9,869,583 B1 * | 1/2018 | Yujiri ........................ G01J 1/44 |

OTHER PUBLICATIONS

Huguenin, G.R.; Millivision Millimeter Wave Imagers; The National Institute of Justice Office of Science and Technology, Cooperative Agreement Project No. 95-IJ-CX-K007, Mar. 28, 2000.

(Continued)

*Primary Examiner* — Casey Bryant
(74) *Attorney, Agent, or Firm* — Patti & Malvone Law Group, LLC

(57) ABSTRACT

A passive millimeter wave (PMMW) camera includes: a lens forming an entrance aperture for the camera, the lens configured to receive millimeter wave (MMW) radiation from a scene so as to form an image at its focus; a polarization beamsplitter positioned behind the lens, the polarization beamspiltter configured to substantially reflect only one polarization of the radiation, and to substantially pass through other polarizations without reflection; a twist reflector configured to receive the reflected radiation from the beamsplitter, and to reflect the MMW radiation back towards the beamsplitter, the twist reflector further configured to rotate the polarization of the incident MMW radiation by 90 degrees, the twist reflector further configured to swivel back and forth around an axle in a plane of the twist reflector so as to move the image back and forth; and a focal plane array (FPA) of millimeter wave receivers configured to receive the radiation passed through the beamsplitter after its polarization was rotated by the twist reflector.

22 Claims, 4 Drawing Sheets

(56) References Cited

OTHER PUBLICATIONS

Williams, T.D. et al; A compact, low-cost, passive MMW security scanner; In Defense and Security, pp. 109-116; International Society for Optics and Photonics, 2005; Proceedings of SPIE vol. 5789; doi: 10.1117/12.603662.

Hu, T. et al; Methods of personnel screening for concealed contraband detection by millimeter-wave radiometric Imaging; 2010 Symposium on Security Detection and Information Processing, available online Dec. 10, 2010.

Siepmann, J. et al; Integrable ultra-compact, high-resolution, real-time MEMS LADAR for the individual soldier; In Military Communications Conference, 2005; MILCOM 2005. IEEE, pp. 3073-3079; IEEE, 2005.

\* cited by examiner

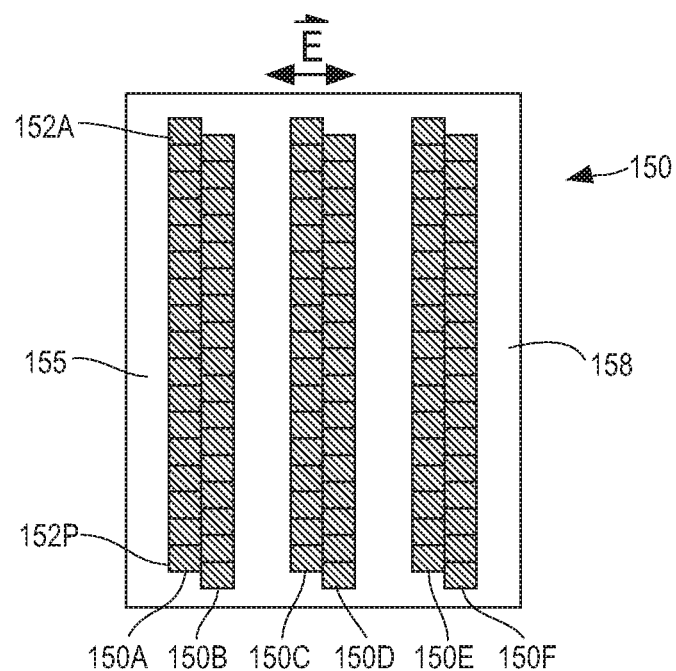

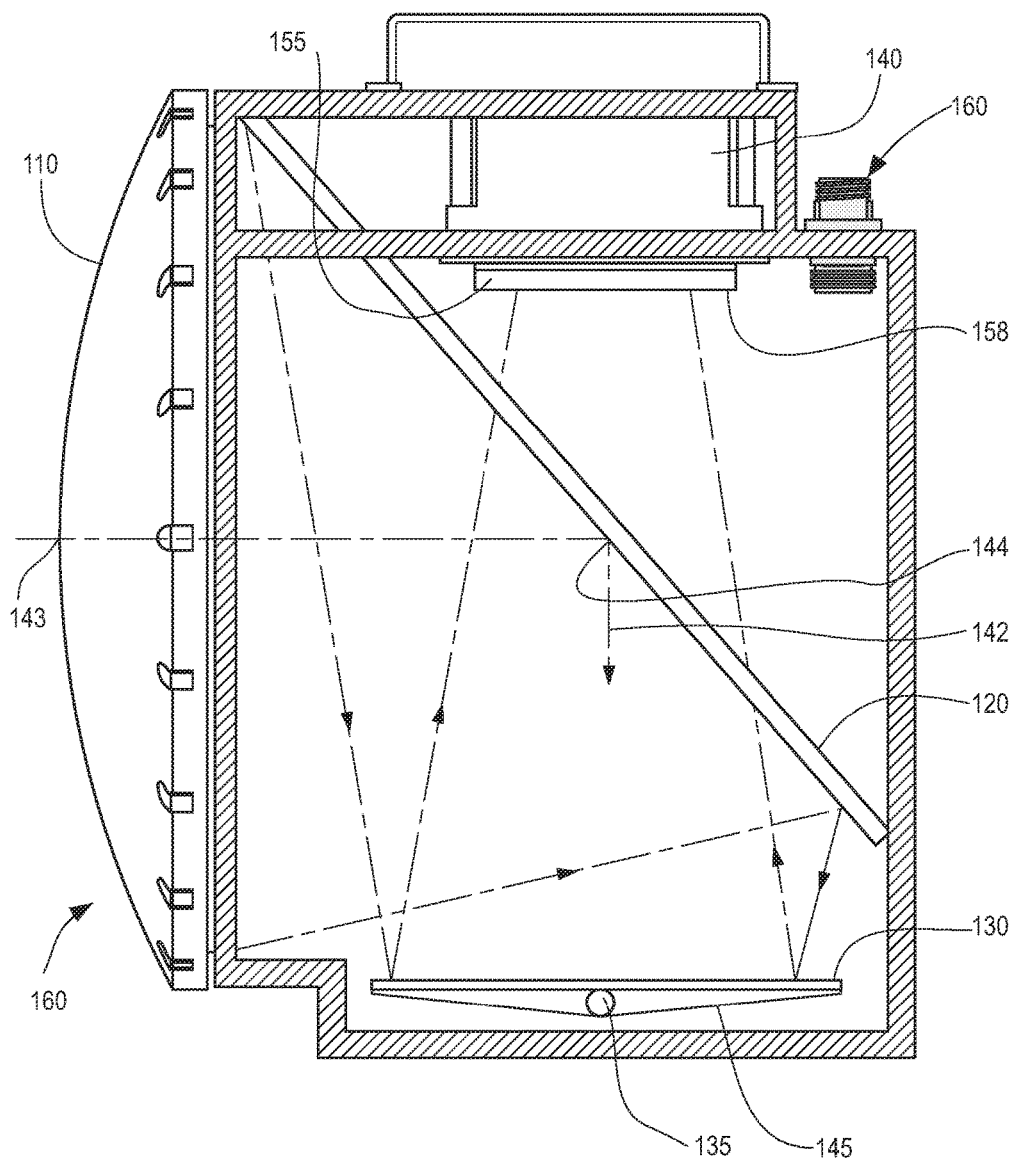

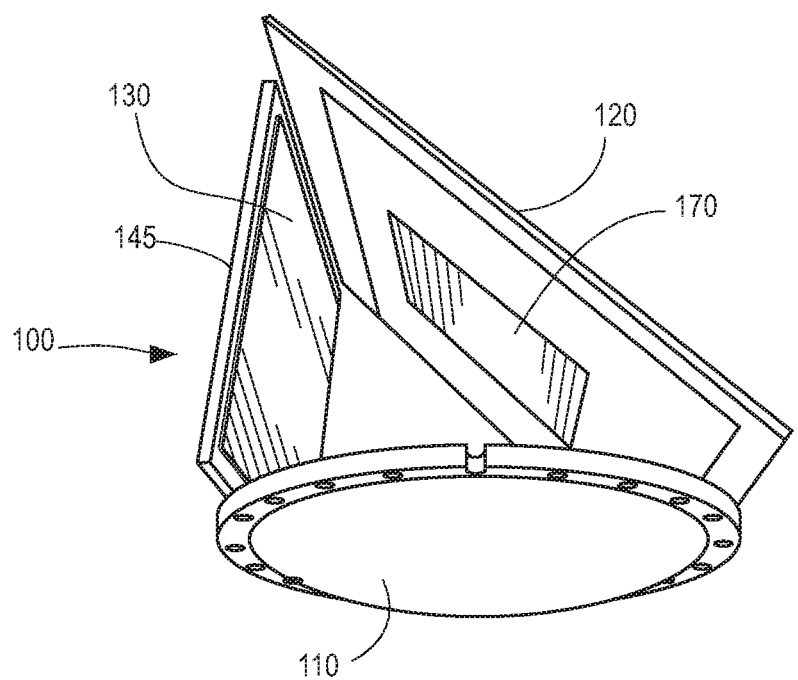

COMPACT PASSIVE MILLIMETER WAVE (PMMW) CAMERA

SUMMARY

A passive millimeter wave (PMMW) camera includes: a lens forming an entrance aperture for the camera, the lens configured to receive millimeter wave (MMW) radiation from a scene so as to form an image at its focus; a polarization beamsplitter positioned behind the lens, the polarization beamspiltter configured to substantially reflect only one polarization of the radiation, and to substantially pass through other polarizations without reflection; a twist reflector configured to receive the reflected radiation from the beamsplitter, and to reflect the MMW radiation back towards the beamsplitter, the twist reflector further configured to rotate the polarization of the incident MMW radiation by 90 degrees, the twist reflector further configured to swivel back and forth around an axle in a plane of the twist reflector so as to move the image back and forth; and a focal plane array (FPA) of millimeter wave receivers configured to receive the radiation passed through the beamsplitter after its polarization was rotated by the twist reflector.

CROSS-REFERENCE TO RELATED APPLICATION

This application contains subject matter that is related to the subject matter of the following applications, which are assigned to the same assignee as this application. The below-listed U.S. patent application is hereby incorporated herein by reference in its entirety:
"IMAGE SCANNING ON A SPARSELY POPULATED FOCAL PLANE ARRAY TO ACHIEVE NYQUIST SAMPLING," by Yujiri, Agravante, and Donovan, filed on Oct. 27, 2016, U.S. Ser. No. 15/335,500.

DESCRIPTION OF THE DRAWINGS

The accompanying drawings provide visual representations which will be used to more fully describe various representative embodiments and can be used by those skilled in the art to better understand the representative embodiments disclosed herein and their advantages. In these drawings, like reference numerals identify corresponding elements.

FIGS. 1A-1D are a set of four drawings showing components of a passive millimeter wave (PMMW) camera.

DETAILED DESCRIPTION

Figure 1A:
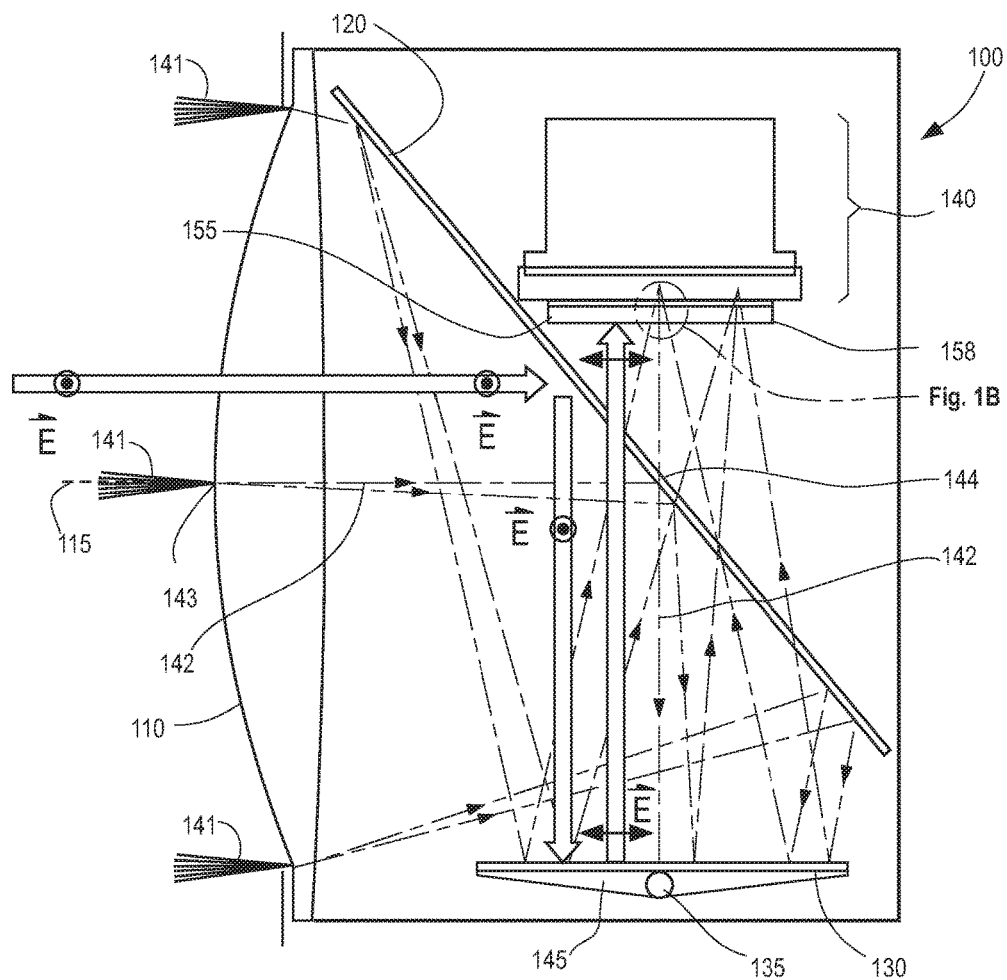

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

According to embodiments of the invention, a passive millimeter wave (PMMW) camera comprises a lens forming an entrance aperture for MMW (millimeter wave) radiation reaching the camera. According to further embodiments of the invention, the PMMW camera further comprises a polarization beamsplitter positioned behind the lens. For example, the polarization beamsplitter comprises a window. For example, the polarization beamsplitter comprises a solid copper cladding on the side of a polarization beamsplitter substrate facing the lens. The polarization beamsplitter substrate is substantially transparent to millimeter wave radiation. For example, the polarization beamsplitter is substantially transparent to radiation having a frequency of approximately 94 gigahertz (GHz). The polarization beamsplitter substrate can have an arbitrary thickness. For example, the window comprises an etched wire grid pattern in the solid copper cladding on the side of a substantially transparent substrate facing the lens. For example, a window is thereby formed configured to let through radiation of a polarization perpendicular to the orientation of the wires in the grid, the window reflecting the polarization parallel to the wires. For example, the window comprises a clear window free of any cladding or wire grid on the side away from the camera lens.

After passing through the lens, the MMW radiation reaches the polarization beamsplitter, which reflects only one polarization of the radiation towards a twist reflector. For example, the twist reflector comprises a scanning twist reflector surface that swivels around an axle in the plane of the surface. In the process of reflection, the twist reflector rotates the polarization of the incident MMW radiation so that what heads back towards the polarization beamsplitter can now pass through the window. The polarization beamsplitter only needs to be polarization sensitive in the portion that passes through the radiation that reflects off the twist reflector. For example, the twist reflector comprises a wire grid pattern on the side of a twist reflector substrate facing the lens. For example, the orientation of the twist reflector wires is 45 degrees relative to the polarization of the incident radiation. For example, the twist reflector substrate comprises a quarter-wavelength thick twist reflector substrate that is substantially transparent to millimeter wave radiation. For example, the twist reflector comprises a solid copper cladding on the side of a twist reflector substrate facing away from the lens.

According to yet other embodiments of the invention, the polarization beamsplitter is positioned at an angle of approximately 45 degrees with respect to an optical axis of the lens. Accordingly, the polarization beamsplitter substantially reflects only one polarization of the incoming radiation.

According to yet further embodiments of the invention, the reflected radiation is then directed to a twist reflector placed approximately normal to a chief ray passing through the center of the lens along the optical axis of the lens. The radiation is then reflected from near the center of the polarization beamsplitter. According to other embodiments of the invention, the twist reflector rotates the polarization of the incident radiation by approximately 90 degrees during the reflection of the incident radiation. According to other embodiments of the invention, the twist reflector swivels back and forth around an axle in the plane of the twist reflector surface to scan the image back and forth at the lens focus at the face of the FPA.

According to other embodiments of the invention, the reflected radiation, now with a 90 degree polarization rotation, heads back towards the polarization beamsplitter, passes through it, and reaches a receiver or focal plane array (FPA) of receivers at the focus of the lens behind the polarization beamsplitter. According to other embodiments of the invention, the back and forth image motion at the FPA imparted by the swiveling twist reflector can be used to advantage as described in the aforementioned U.S. patent application "IMAGE SCANNING ON A SPARSELY POPULATED FOCAL PLANE ARRAY TO ACHIEVE NYQUIST SAMPLING," by Yujiri, Agravante, and Donovan, filed on Oct. 27, 2016, U.S. Ser. No. 15/335,500. According to certain embodiments of the invention, the overall camera shape is approximately cubical.

FIGS. 1A-1D are a set of four drawings showing components of a passive millimeter wave (PMMW) camera.

FIG. 1A is a schematic drawing of components of a PMMW camera 100. The PMMW camera 100 comprises a lens 110 having an optical axis 115, a polarization beamsplitter 120, a scanning twist reflector 130 that rotates on an axle 135, and a focal plane array (FPA) 140. Incoming radiation is represented by a fan of rays 141 coming from the scene to the left of the camera 100. The fan of rays 141 comprises a chief ray 142. The lens 110 has a lens center 143. The chief ray 142 passes through the lens center 143 along the optical axis 115 and is then reflected from the beamsplitter at a point 144.

For example, the scanning twist reflector 130 comprises a twist reflector 130. For example, the twist reflector 130 is mounted on a swiveling platform 145. For example, while the axle 135 rotates, the twist reflector 130 scans an image (not shown) across the FPA 140, focusing millimeter wave (MMW) radiation onto the FPA 140. Tilting the twist reflector 130 will change the position of the image (not shown) on the FPA 140. Typically, although not necessarily, the scanning twist reflector 130 is placed approximately normal to the chief ray 142.

As depicted, the lens 110 comprises a simple lens 110. The lens 110 forms an entrance aperture for the camera 100. As depicted, the polarization of the radiation passing through the lens 110 that reflects off of the polarization beamsplitter 120 is substantially out of the plane of the page.

As depicted, the polarization of the incoming radiation is out of the page. The polarization beamsplitter 120 may be positioned behind the lens 110. As depicted, the polarization beamsplitter 120 is positioned at an angle of approximately 45 degrees with respect to the optical axis 115. For example, the polarization beamsplitter 120 comprises a linear wire grid array. As depicted, the polarization beam splitter 120 comprises a linear wire grid array with the wires aligned in a direction out of the plane of the page. Accordingly, the polarization beamsplitter 120 substantially reflects only one polarization of the incoming radiation, namely, a polarization perpendicular to the plane of the page, and substantially passes through without reflection a polarization in the plane of the page.

The image (not shown) is moved across the FPA 140 using the swiveling twist reflector 130. Alternatively, the FPA 140 can be moved across a non-moving MMW image. The FPA 140 comprises an FPA face.

As illustrated in FIG. 1B, the FPA face 150 comprises six columns 150A, 150B, 150C, 150D, 150E, and 150F. For example, one or more of the columns 150A-150F comprises a plurality of millimeter wave receivers. For example, the plurality of millimeter wave receivers comprises a stack of millimeter wave receivers.

As shown in FIG. 1B, the columns 150A-150F comprise a plurality of receivers 152. For example, column 150A comprises receivers 152A-152P (cross-hatched boxes). The receivers 152A-152P are configured to receive MMW radiation whose polarization direction is shown going from left to right in the FIGURE. The receivers 152A-152P comprise one or more of an amplifier and a detector. For example, the receivers 152A-152P comprise one or more of a high-speed, low-noise amplifier (LNA) and a compatible detector. For example, the LNA is configured to respond to MMW frequencies.

A combined noise level of the LNA and the detector can be low enough to avoid obscuring the image. For example, high-speed is defined as capable of responding to MMW frequencies of approximately 89 GHz to approximately 99 GHz. For example, high-speed is defined as capable of responding to MMW frequencies of approximately 44 GHz to approximately 220 GHz. For example, low-noise is defined as having a Noise Figure (NF) less than or equal to approximately 5 dB. For example, low-noise is defined as having a Noise Figure (NF) less than or equal to approximately 4 dB. For example, a compatible detector has a conversion factor of at least approximately 10,000 volts per watt (V/W). For example, a compatible detector has a noise equivalent power (NEP) of better than 2 pW/root Hz.

For example, at least one of the receivers 152A-152P comprises one or more of a high-speed, low noise amplifier (LNA) and a compatible detector. For example, at least one of the receivers 152A-152P comprises modern MMIC (Microwave/millimeter wave Monolithic Integrated Circuit) components.

The receivers 152A-152P are further configured to directly convert the received millimeter wave radiation into an electrical signal, without requiring a local oscillator. The receivers 152A-152P are further configured to directly convert the received millimeter wave radiation into an electrical signal, without requiring a mixer. For two adjacent columns, one column is shifted, or staggered, by half a pixel relative to the other column. For example, columns 150A and 150B, columns 150C and 150D, and columns 150E and 150F and so on, each has one column that is shifted, or staggered, by half a pixel relative to the other column in the pair. The receivers 152A-152P have a preferred polarization orientation as shown by the electric field vector E in FIG. 1B. The receivers 152A-152P are aligned with the polarization of the incident MMW radiation.

The gaps between pairs of columns (between 150B and 150C, and between 150D and 150E) are created to reduce the cost of the FPA 140 by reducing the number of receivers needed to sample the image.

An image top point 155 is approximately located where the top of the image lands on the FPA 140. An image bottom point 158 is approximately located where the bottom of the image lands on the FPA 140.

Returning to FIG. 1A, the image top point 155 and the image bottom point 158 are also indicated in FIG. 1A. The reflected radiation from the polarization beamsplitter 120 is then directed to the twist reflector 130. The twist reflector 130 may be configured to rotate about an axle perpendicular to the plane of the page. This feature enables a scan of the image across the FPA 140, enabling not only a dithering of the image to attain Nyquist sampling of the image, but also a reduction of the number of receivers in the FPA 140, as shown in FIG. 1B and as described in the aforementioned U.S. patent application "IMAGE SCANNING ON A SPARSELY POPULATED FOCAL PLANE ARRAY TO ACHIEVE NYQUIST SAMPLING," by Yujiri, Agravante, and Donovan, filed on Oct. 27, 2016, U.S. Ser. No. 15/335, 500.

As the twist reflector 130 swivels back and forth about the axle 135, the image moves back and forth across the FPA 140. The twist reflector 130 can rotate back and forth about the axle 135 perpendicularly to the plane of the page, as shown in FIG. 1A. Alternatively, or additionally, the twist reflector 130 can rotate about the axle 135 parallel to the plane of the page. The scanning twist reflector 130 is configured to rotate the polarization of the incident radiation by approximately 90 degrees as it reflects it. Accordingly, as depicted in FIG. 1A, the polarization of the radiation reflected from the twist reflector 130 is pointing from left to right in the plane of the page.

The FPA 140 is positioned so that the image (not shown) moves transverse to the columns 150A-150F of receivers 152A-152P. Accordingly, the receivers 152A-152P can sample the image (not shown) correctly relative to the way the image moves. As pixels are sensitive to one given polarization, how the pixels are stacked in the FPA 140 determines in which direction the FPA 140 is oriented.

According to other embodiments of the invention, the reflected radiation, now with a 90 degree polarization rotation, heads back towards the polarization beamsplitter 120, passes through it, and reaches the FPA 140. For example, the FPA 140 comprises a single receiver 152. For example, the FPA 140 comprises an array of receivers 152A-152P.

FIG. 1C is an interior drawing of components of the PMMW camera 100, including the lens 110, the polarization beam splitter 120, the twist reflector 130, the axle 135, the FPA 140, the lens center 143, the chief ray 142 and the point 144 where the chief ray 142 intersects the polarization beamsplitter 120, the swiveling platform 145, the image top point 155, and the image bottom point 158. Also shown is an electrical feedthrough connector 160 for power and signal lines.

FIG. 1D is a drawing of a working embodiment of the PMMW camera 100, including the lens 110, the polarization beam splitter 120, the twist reflector 130, and the swiveling platform 145. Also shown is the window 170 comprised in the polarization beam splitter 120. Not visible is the FPA 140. In this example, the lens 110 comprises a 12-inch clear aperture lens 110.

Embodiments of the invention provide numerous benefits. The arrangement of these elements makes it possible to utilize the space between the lens and the FPA more efficiently (the radiation passes through the volume three times instead of just once), thus leading to a much more compact camera. The manipulation of the polarization is used to fold the optical path on itself, thereby reducing the volume within the camera by a factor of approximately two to approximately three. This folding technique allows the final reflective element (in this case, a twist reflector) before the FPA to swivel to scan the image back and forth across the FPA.

It will be further understood by those of skill in the art that the number of variations of the invention and the like are virtually limitless. It is intended, therefore, that the subject matter in the above description shall be interpreted as illustrative and shall not be interpreted in a limiting sense.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention.

It is intended, therefore, that the subject matter in the above description shall be interpreted as illustrative and shall not be interpreted in a limiting sense.

I claim:

1. A passive millimeter wave (PMMW) camera, comprising:
    a lens forming an entrance aperture for the camera, the lens configured to receive millimeter wave (MMW) radiation from a scene so as to form an image at its focus;
    a polarization beamsplitter positioned behind the lens, the polarization beamspilter configured to substantially reflect only one polarization of the radiation, and to substantially pass through other polarizations without reflection;
    a twist reflector configured to receive and reflect the MMW radiation, the twist reflector further configured to rotate the polarization of the incident MMW radiation, the twist reflector further configured to swivel back and forth around an axle in a plane of the twist reflector so as to move the image back and forth; and
    a focal plane array (FPA) of receivers configured to receive the radiation.

2. The PMMW camera of claim 1, wherein the FPA is configured to move across a non-moving image.

3. The PMMW camera of claim 1, wherein the polarization beamsplitter is positioned at an angle of approximately 45 degrees with respect to an optical axis of the lens.

4. The PMMW camera of claim 1, wherein the polarization beamsplitter comprises a solid copper cladding on a side of a substantially transparent polarization beamsplitter substrate facing the lens.

5. The PMMW camera of claim 1, wherein the polarization beamsplitter comprises a linear wire grid pattern etched into the solid copper cladding on a side of a substantially transparent polarization beamsplitter substrate facing the lens.

6. The PMMW camera of claim 1, wherein the polarization beamsplitter comprises a window.

7. The PMMW camera of claim 6, wherein the window comprises an etched linear wire grid pattern in the solid copper cladding on a side of a substantially transparent polarization beamsplitter substrate facing the lens, the window configured to reflect radiation of a desired polarization and to let through radiation of a polarization rotated by approximately 90 degrees.

8. The PMMW camera of claim 1, wherein the twist reflector comprises a scanning twist reflector.

9. The PMMW camera of claim 1, wherein the twist reflector performs one or more of reflecting and rotating the polarization of incident MMW radiation by approximately 90 degrees.

10. The PMMW camera of claim 1, wherein the twist reflector comprises one or more of a linear wire grid pattern on a side of a substantially transparent twist reflector substrate facing the lens, the twist reflector further comprising a solid copper cladding on the side of the twist reflector substrate facing away from the lens.

11. The PMMW camera of claim 10, wherein the twist reflector substrate has an approximate thickness of one-fourth of a wavelength of the MMW radiation.

12. The PMMW camera of claim 1, wherein the twist reflector reflects and rotates the polarization of the incident radiation by approximately 90 degrees.

13. The PMMW camera of claim 1, wherein the twist reflector sits on an axle.

14. The PMMW camera of claim 13, wherein the axle comprises a swiveling platform.

15. The PMMW camera of claim 14, wherein while the swiveling platform swivels back and forth, the twist reflector scans the image back and forth across the FPA.

16. The PMMW camera of claim 15, wherein tilting the twist reflector changes the position of the image on the FPA.

17. The PMMW camera of claim 1, wherein the FPA comprises a single receiver.

18. The PMMW camera of claim 1, wherein the FPA comprises an array of receivers.

19. The PMMW camera of claim 18, wherein the array comprises a plurality of columns, at least one column comprising receivers.

20. The PMMW camera of claim 19, wherein a column of receivers is shifted, or staggered, by half a pixel relative to an adjacent column of receivers.

21. The PMMW camera of claim 1, wherein the FPA is located at the approximate focus of the lens.

22. The PMMW camera of claim 1, wherein the FPA is located behind the polarization beamsplitter.

* * * * *